United States Patent [19]

Schuler

[11] 3,934,319
[45] Jan. 27, 1976

[54] CUTTING INSERTS
[75] Inventor: Paul A. Schuler, Erie, Pa.
[73] Assignee: General Electric Company, Schenectady, N.Y.
[22] Filed: Apr. 21, 1975
[21] Appl. No.: 570,301

[52] U.S. Cl. .............................. 29/95 R; 29/95 R
[51] Int. Cl.² ......................................... B26D 1/00
[58] Field of Search .............................. 29/95, 96

[56] References Cited
UNITED STATES PATENTS

| | | | |
|---|---|---|---|
| 3,229,349 | 1/1966 | Leksell | 29/95 R |
| 3,279,035 | 8/1966 | Johnson | 29/95 R |
| 3,421,196 | 1/1969 | Reich | 29/95 R |
| 3,497,933 | 6/1970 | Okada | 29/95 R |

*Primary Examiner*—Harrison L. Hinson

[57] ABSTRACT

Improved point geometry is provided for cutting inserts wherein the insert point is subjected to physical and thermal shock in first contacting the stock to be cut and is particularly applicable to cemented carbide or hard metal inserts. It has been found that the provision of about a 104° included angle at the initial work-contacting or lead portion of the insert tip provides improved resistance to physical and thermal shock and longer insert life. While the new cutting insert is especially useful in interrupted cutting where the insert is continuously engaged and disengaged as in the case of a series of cutting inserts in a milling head in contacting an uneven surface, it is also applicable to boring and turning operations and to continuous cutting where the insert point is stressed.

7 Claims, 4 Drawing Figures

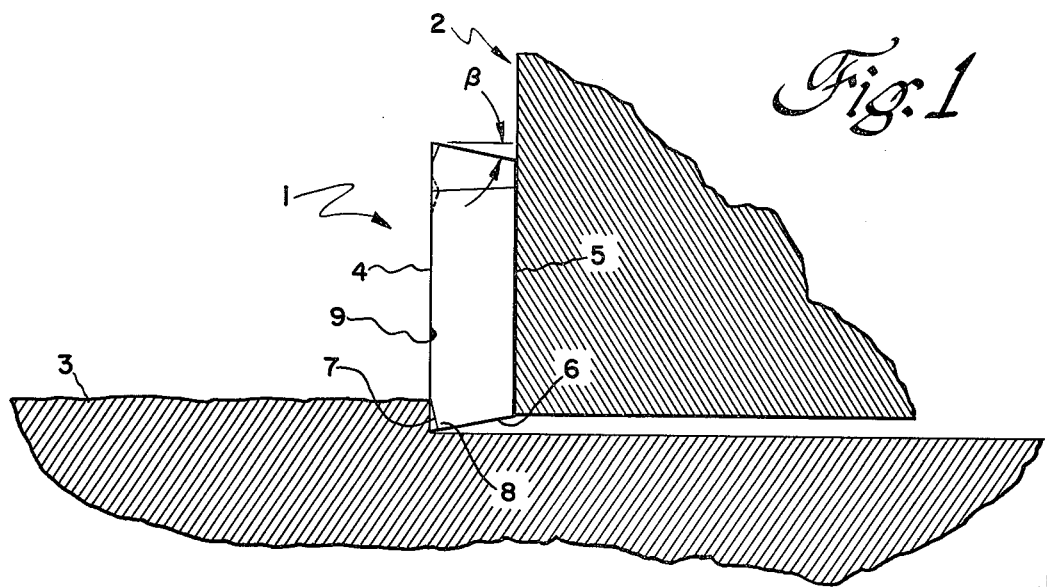
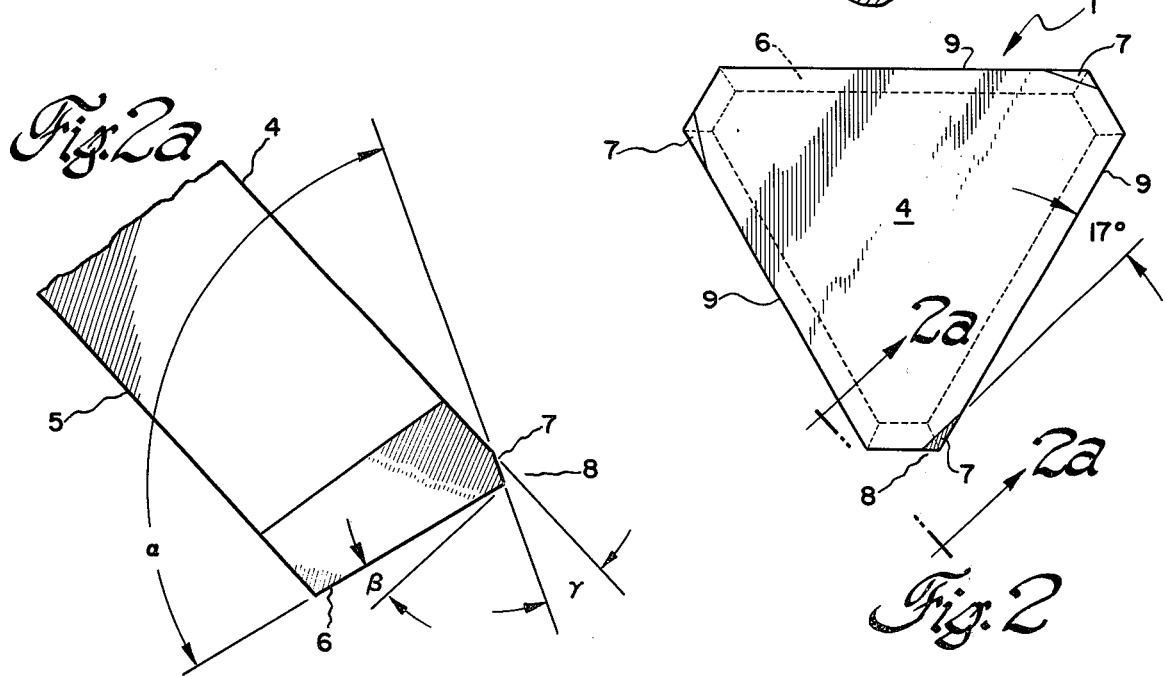
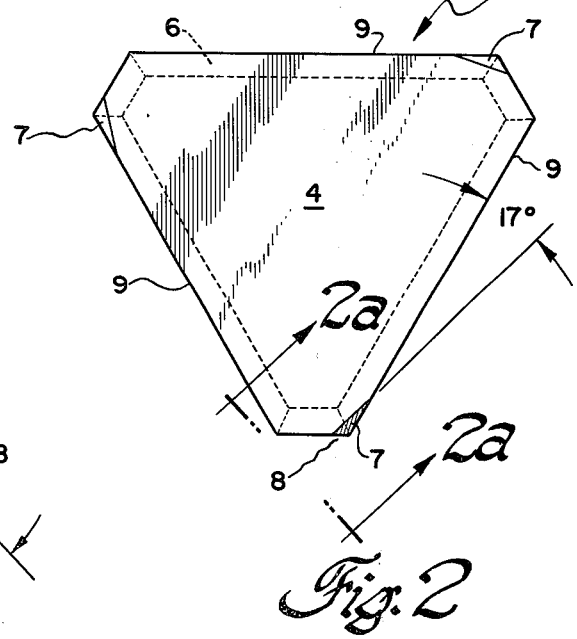
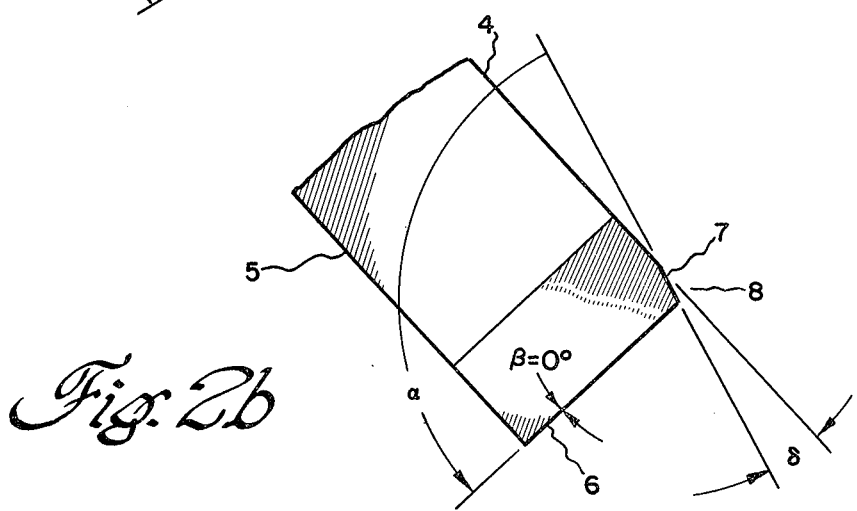

CUTTING INSERTS

This invention relates to improved cutting inserts or bits. More particularly, it relates to improved point geometry for cutting inserts.

It is well known that in metal cutting operations such as the milling of forgings having irregular surfaces using milling cutters having a plurality of cutter inserts such as those of cemented carbide or hard metal, the points of the normal inserts are subject to early failure because of physical and heat shock particularly when initial contact with the stock is at the insert point as opposed to being spread over the entire insert cutting edge or when contact with the work begins behind the point such as in negative rake inserts. While such insert failure is particularly noticeable in the case of milling cutters, it also occurs in boring operations and in general turning of pieces having irregular surfaces.

It has been proposed to lengthen the life of such cutting edges by various so-called insert cutting edge modifications. For example, it is a generally accepted practice to hone or radius the cutting edge to the extent of 0.002 inch to 0.009 inch or more. A hone of 0.002 inch to 0.004 inch radius in cutting of the present type provides practically no increase in insert life, the point failing after one or two pieces have been milled. A hone of 0.004 inch to 0.006 inch is slightly better with a depth of cut from 0 to ⅜ inch. It will be understood that when the insert point fails, the failure often spreads along the entire cutting edge with smearing and removal of the cutter material, heat checking and the like. While a hone of 0.004 inch to 0.006 inch radius represented a slight improvement to the extent that the edge failed after about 2 to 5 pieces as opposed to only one or two, it will be quite apparent that the insert so treated leaves much to be desired, and it is a primary object of this invention to substantially improve the effective life of cutter inserts especially where the insert point is subjected to massive physical and heat shock as in initially contacting irregular surfaces. These severe conditions are even more aggravated when, as in milling operations, necessary spindle overhang tends to cause chatter and vibration.

It has been found that the life of the insert point which is subjected to severe physical and heat shock in impacting stock is surprisingly improved or lengthened when the leading edge of the insert point is beveled so that the included angle between the bevel plane through the point and to the adjacent flank is about 104°, the bevel being tapered to meet the edge of the insert at about 0.090 inch to 0.110 inch from the point with an included angle between the bevel-face line or boundary and the cutter edge of about 17°. Deviations of over about 4° above the 104° angle result in early degradation of the cutter as do variations in the tapering of the bevel from the above parameters. Likewise, a deviation of more than 2° below 104° is unsatisfactory.

The present invention relates to positive inserts having sloping sides or flanks as well as to negative inserts having parallel flanks or sides and to inserts of different sizes and shapes so long as the prescribed point geometry is followed. For example, the inserts can be triangular, square, hexagonal, octagonal, diamond shaped, or of other polygonal configurations, and the points at which the sides meet can be, if desired, radiused or truncated. The inserts can likewise be left handed or right handed, or both, as desired. In the case of negative inserts, the present point geometry can be applied to the cutting points at both the upper and lower insert surfaces.

Those features of the invention which are believed to be novel are set forth with particularity in the claims appended hereto.

The invention will, however, be better understood from a consideration of the following description and the drawing in which FIG. 1 is a schematic elevational view of a typical present cutter insert as mounted in a milling head or other tool holder.

FIG. 2 is a plan view of a truncated triangular cutter insert embodying the present invention.

FIG. 2a is a view in the direction 2a—2a of FIG. 2 and

FIG. 2b is a similar view except that the flanks or sides of the cutter are parallel rather than tapered as in FIG. 2a.

Referring to the drawing, in FIG. 1 a cutting insert 1 is shown schematically mounted on tool holder, here a cutter head, 2 and in contact with the work 3. Here insert 1 is of the positive type having one surface 4 larger than the other parallel surface 5 and having tapered flanks 6. The angle $\beta$ of taper between the flank 6 and the perpendicular to the larger insert side 4 varying as desired within reason, the angle $\beta$ in the case illustrated being 11°, although it can typically range from 7° to 20° or even over a wider range. It will be seen that without the bevel 7 at point 8 of the present invention, the included point angle with the 11° flank angle would be 79°. It has been found that this point geometry, as do others with the flank angle $\beta$ down to 0°, the latter for negative inserts, is too restricted and results in early point failure and failure of the cutting edge 9 in general. Only when the included point angle of about 102° to 108° and the other parameters of the bevel 7 are adhered to is the surprisingly long life of the point 8 and of cutting edge 9 attained. Other parameters of the point geometry are shown in FIG. 2 which is a plan view of insert 1 with the larger face 4 upward. Here the bevel 7 has been cut with an angle of 17° between the bevel-face boundary line as extended and cutting edge 9 and extending in tapered fashion along said edge 9 at from about 0.090 inch to 0.110 inch where it meets or intersects the edge 9. These dimensions, as is the improved point angle $\alpha$ best shown in FIGS. 2a and 2b, are independent of the size and shape of the insert and the length of the cutting edge. Increasing $\alpha$ over about 108° and increasing the 0.110 inch dimension results in increased power consumption and undesirable thrust forces against the work piece and cutter spindle as well as promoting a tendency for the work piece to back out of the cutter in milling operations.

Shown in FIG. 2a is a view in the direction 2a—2a of FIG. 2 showing bevel 7 and the included angle $\alpha$ of about 104°. Here, with a flank angle $\beta$ of 11°, the angle $\gamma$ between the surface plane of bevel 7 and the larger face 4 of the insert is 25°. Again, as the flank angle $\beta$ varies, angle $\gamma$ will vary as the angle $\alpha$ remains at the optimum of about 104°.

Shown in FIG. 2b is a view similar to FIG. 2a except that the flank angle $\beta$ is 0° to provide a parallel sided or flanked negative insert. Here with the other geometry imposed as above, it will be noted that the angle $\delta$ between the surface plane of bevel 7 with the adjacent face 4 of the insert is 14°.

It is advantageous to have the cutting edges of the present inserts honed to a radius of from about 0.004 inch to 0.009 inch, and preferably 0.006 inch to 0.008 inch, such honing additionally adding to the life of the cutting edge in conjunction with the prescribed point geometry. It is not necessary to include the grind or bevel 7 in the hone. As pointed out above, it has been found that lowering the angle α below about 102° results in undesirable degradation of the point and failure. Angle α should be held to about 102° to 108° and preferably at 104° in conjunction with the other parameters.

The present insert point geometry, as will be evident, can be adapted to positive and negative inserts and is particularly useful when relatively expensive insert material such as cemented carbides or coated cemented carbides or other hard materials are used and life is desirably extended from an economic point of view. Where the insert sides are parallel with the insert faces as in negative inserts, all edges can be utilized as cutting edges and all points modified as herein. The cutter points can also, if desired, be truncated as illustrated or radiused. Where radiused corner inserts are used, the maximum radius for the present 104° point is preferably not over about 3/64 inch.

While the present invention has been discussed with particular reference to milling cutter inserts or bits, it will be obvious that it can be adapted to boring and turning operations as well, the advantages of the invention being especially realized where the point of the insert is impacted or subjected to heavy and sudden physical and heat shock as in initially contacting irregularly surfaced work pieces.

What I claim as new and desire to secure by Letters Patent of the United States is:

1. A cutting insert having top and bottom polygonal faces, the corresponding edges of said faces being joined by flanks, each flank defining at least one cutting edge with at least one adjoining face, each mutually abutting pair of faces and pair of flanks forming at least one cutting edge point, the leading edge of each cutting edge point being beveled, the angle between the plane of the bevel through the cutting edge point to the flank adjoining the bevel being from about 102° to 108°.

2. A cutting insert as in claim 1 in which the flanks are tapered from about 7° to 20°.

3. A cutting insert as in claim 1 in which said flanks are perpendicular to the surfaces of said insert.

4. A cutting insert as in claim 1 wherein the angle between the line joining the bevel and the adjoining face, extended along the inserted edge, and the insert edge is about 17°, said line meeting said insert edge at about 0.09 to 0.11 inch from the point.

5. An insert as in claim 1 in which each cutting edge point is radiused or honed.

6. A cutting insert as in claim 1 in which each cutting edge point is truncated.

7. A cutting insert as in claim 4 where each cutting edge is honed to a radius of about 0.004 inch to 0.009 inch.

* * * * *